United States Patent [19]

Rosenbaum

[11] 4,402,898
[45] Sep. 6, 1983

[54] COEXTRUSION DIE ASSEMBLY

[75] Inventor: Larry A. Rosenbaum, Findlay, Ohio

[73] Assignee: Hancor, Inc., Findlay, Ohio

[21] Appl. No.: 306,468

[22] Filed: Sep. 28, 1981

[51] Int. Cl.³ .............................................. B29F 3/10
[52] U.S. Cl. ............................... 264/173; 264/209.3;
  264/209.8; 425/133.1; 425/376 A; 425/380;
  425/466; 425/467
[58] Field of Search ................. 264/173, 209.8, 209.3,
  264/209.4, 146–147; 425/133.1, 131.1, 466–467,
  380, 376 A

[56] References Cited

U.S. PATENT DOCUMENTS

| 2,501,690 | 3/1950 | Prendergast | 425/133.1 |
|---|---|---|---|
| 3,265,552 | 8/1966 | Berggren et al. | 264/146 |
| 3,266,092 | 8/1966 | Corbett | 264/209.8 |
| 3,533,134 | 10/1970 | Blomqvist | 425/133.1 |
| 3,677,676 | 7/1972 | Hegler | 425/133.1 |
| 3,899,276 | 8/1975 | Sokolow | 425/376 A |
| 3,932,102 | 1/1976 | Rosenbaum | 425/466 |
| 4,045,154 | 8/1977 | Ratheiser | 264/209.8 |
| 4,062,712 | 12/1977 | Stark | 264/146 |
| 4,125,585 | 11/1978 | Rosenbaum | 264/173 |
| 4,157,194 | 6/1979 | Takahashi | 264/146 |
| 4,161,379 | 7/1979 | Sudyk | 425/133.1 |
| 4,208,175 | 6/1980 | Rosenbaum | 425/131.1 |
| 4,249,875 | 2/1981 | Hart et al. | 425/133.1 |
| 4,268,239 | 5/1981 | Herrington, Jr. | 425/467 |
| 4,305,703 | 12/1981 | Lupke et al. | 425/133.1 |

Primary Examiner—Jeffery R. Thurlow
Attorney, Agent, or Firm—Fay & Sharpe

[57] ABSTRACT

The coextrusion die assembly receives a first and a second plasticized material flow which it forms into a layered, cylindrically tubular flow. An inlet block (100) receives the first material flow axially and the second material flow radially. A manifold block (200) forms the first material flow into a cylindrical flow and divides the second material flow into eight equal flow portions. A spider structure (300) has a first plurality of apertures (302–308) which pass the first material flow and eight second apertures (330–344) which receive the eight second material flow portions from the manifold. Each of the eight second spider apertures has a relatively small upstream opening and fans peripherally outward into a continuous cylindrical downstream region. A non-linear restriction means (440–454) provides a greater restriction in longitudinal alignment with the center of each of the second apertures and a less restrictive region therebetween. The nonlinearity of the non-linear restrictive region is the inverse of anticipated axial velocity gradients in the second material flow such that it averages out any velocity gradients in the second material flow.

33 Claims, 10 Drawing Figures

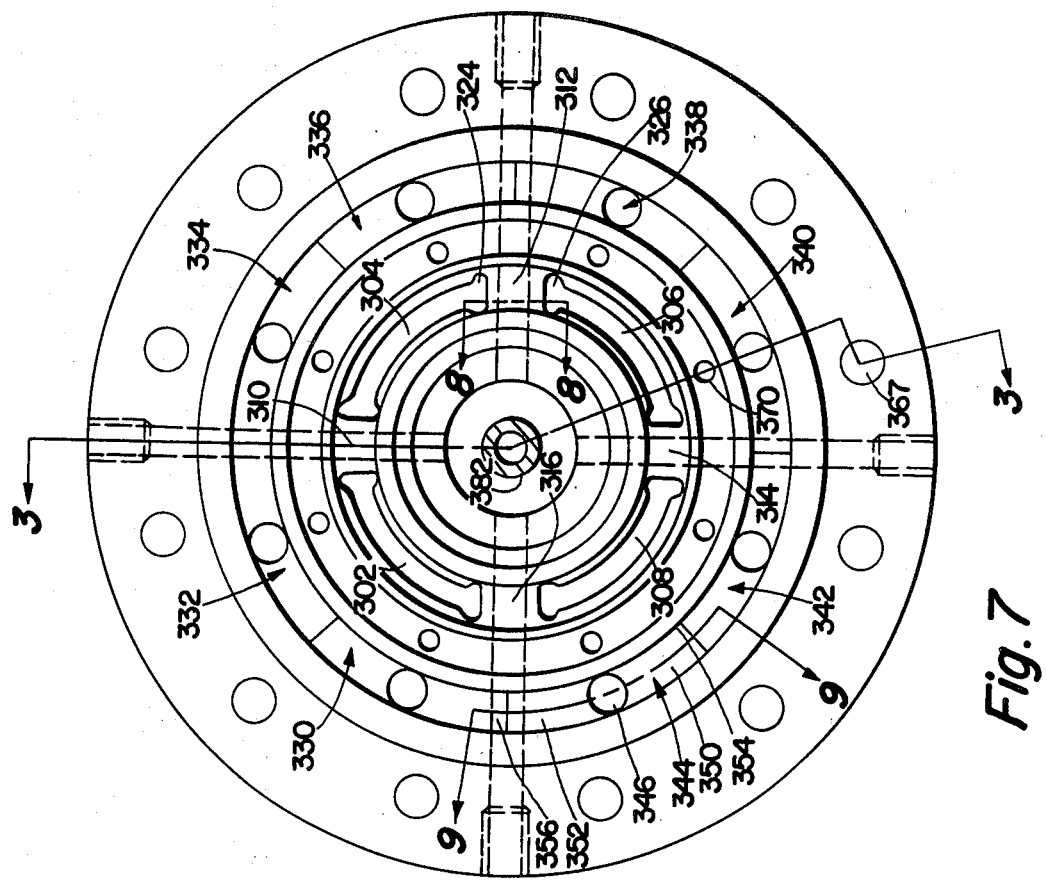
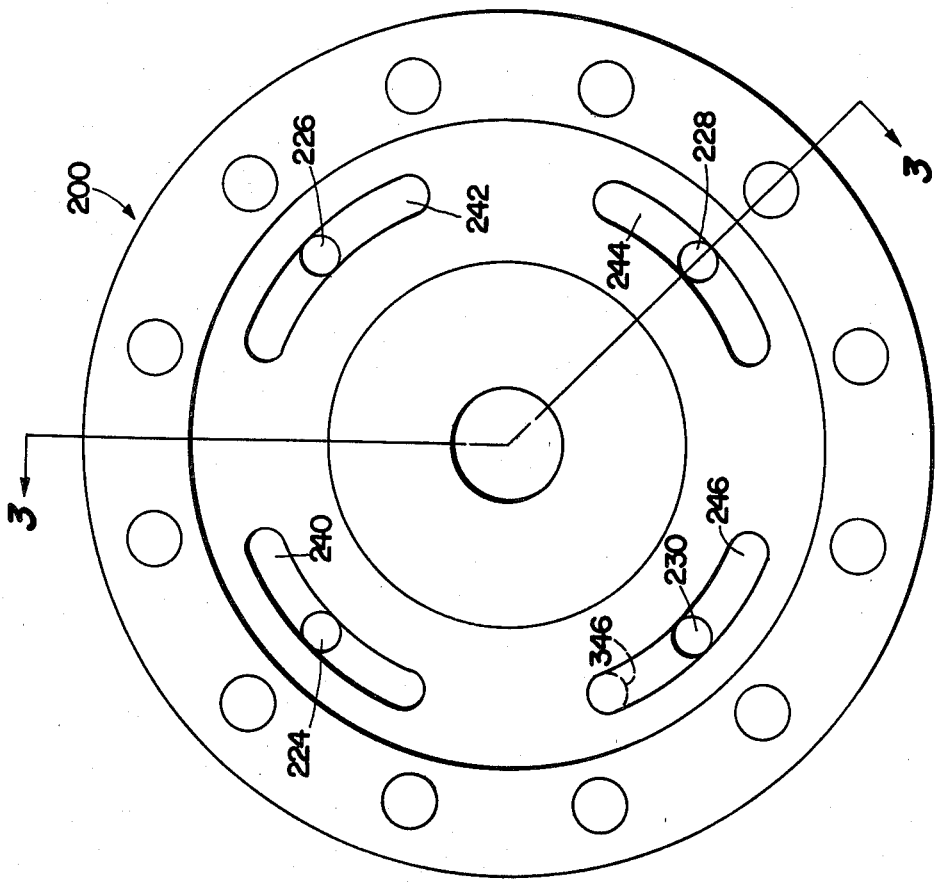
Fig. 7
Fig. 6

COEXTRUSION DIE ASSEMBLY

BACKGROUND OF THE INVENTION

This application pertains to the art of plastic extrusion and more particularly to the art of simultaneously extruding a plurality of plastic materials in layers. The present invention finds particular application in the extrusion of layered plastic cylindrical sleeves for manufacture into corrugated tubing products. It is to be appreciated, however, that the invention has broader applications including manufacturing smooth walled circular pipe or tubing products, hollow rounded rod or support structures, rounded and nonrounded tubular products, and the like.

Heretofore, extruders for corrugated and other tubing products have most common extruded a single component, nonlayered sleeve of plastic material for corrugating or shaping into the tubing product. Commonly, a single component extruding die had a single, axial inlet. A conical divider divided the received flow of plastic into a cylindrical form. The cylindrical plastic flow was divided among a circle of apertures disposed in the spider. On the other side of the spider, the plastic from the spider apertures merged together into an outlet cylindrical passage. Various circumferentially uniform, annular restrictions and circumferentially enlarged annular areas or plenums were disposed in the outlet cylindrical passage to encourage the plastic to flow together into a smooth uniform sleeve. The spider provided mechanical support for the structures which defined the cylindrical passages on its upstream and downstream sides. Particularly, it supported the structures which defined the inner surfaces of the cylindrical passages.

Commonly to manufacture layered plastic tubing, a feedblock was positioned between the extrusion die inlet and two or more plastic extruders, such as is shown in my earlier U.S. Pat. Nos. 4,125,585 and 4,208,175. In the feedblocks, two or more flows of plastic material where shaped into cylindrical, concentric plastic sleeves to form a layered plastic flow. The generally cylindrical layered plastic flow was received by the axial inlet of the extrusion die. Of necessity, the layered plastic flow was divided by the spider apertures and recombined in the outlet cylindrical passage. To make additional layers, additional feedblocks were positioned in series upstream from the extrusion die.

One of the problems encountered in the prior art is preventing the layers from intermixing, particularly as the layered flow is divided and recombined around the spider. Dividing and recombining a layered flow through the spider apertures requires that the plastic materials be rheologically compatible. If the plastic materials have significantly different flow characteristics, the thicknesses of the layers vary as the flow recombines downstream from the spider. Rheologically noncompatible plastics in the layered flow become intermixed and may even become striped with one layer protruding through another. Such intermixing not only causes a visually unattractive product, but also losses the physical properties that the layering was designed to achieve.

BRIEF DESCRIPTION OF THE INVENTION

The present invention provides a new and improved extrusion die assembly which overcomes the above referenced problems and others.

In accordance with the present invention, there is provided an extrusion die assembly for extruding multi-layered tubular products. The extrusion die assembly comprises a spider structure which has an upstream side, a downstream side, a first plurality of apertures extending between the upstream and downstream sides generally surrounding a longitudinal axis, and a second plurality of apertures extending between the upstream and downstream sides generally surrounding the longitudinal axis. Each aperture of the second plurality is defined by a discrete opening adjacent the upstream side and fans peripheral toward a substantially continuous annulus generally adjacent the downstream side. A first inlet means defines a first inlet and a second inlet means defines a second inlet. A manifold means connects the first inlet means with the upstream side of the first spider structure apertures and connects the second inlet means with the upstream side of the second spider structure apertures. A first tubular passage means defines a first tubular passage operatively connected with the upstream side of the first spider structure first apertures and a second tubular passage means defines a second tubular passage which is operatively connected with the downstream side of the second spider structure apertures. The first and second tubular passage means have downstream ends which are generally concentric and come together at a tubular outlet passage.

In accordance with another aspect of the invention, a nonlinear restriction means is disposed in the second tubular passage for restricting the width of the passage non-uniformly around it periphery. The nonlinear restriction means defines more restrictive regions substantially in longitudinal alignment with the spider structure second aperture openings and less restrictive regions therebetween.

In accordance with yet another aspect of the present invention, the extrusion die assembly extrudes the layered plastic sleeve into a corrugator which molds the sleeve into continuous lengths of layered, corrugated tubing.

A primary advantage of the present invention is that it extrudes multi-layered sleeves of plastic materials.

Another advantage of the present invention is that it extrudes multi-layered sleeves of rheologically compatible and rheoglogically non-compatible plastic materials.

Yet another advantage of the present invention is that it can extrude a multi-layered sleeve in which the layers are different thicknesses. The present invention is adapted for extruding a multi-layered sleeve in which one layer is very thin compared to another.

Still further advantages of the present invention will become apparent upon reading and understanding the following detailed description of the preferred embodiment.

BRIEF DESCRIPTION OF THE DRAWINGS

The invention may take form in various parts and arrangements of parts or various steps and arrangements of steps. The drawings are only for purposes of presenting a preferred embodiment of the present invention and are not to be construed as limiting the invention.

FIG. 6 is a transverse sectional view through section 6—6 of the coextrusion die assembly of FIG. 3;

FIG. 7 is a transverse sectional view through section 7—7 of the coextrusion die assembly of FIG. 3;

DESCRIPTION OF THE PREFERRED EMBODIMENT

Figure 1:
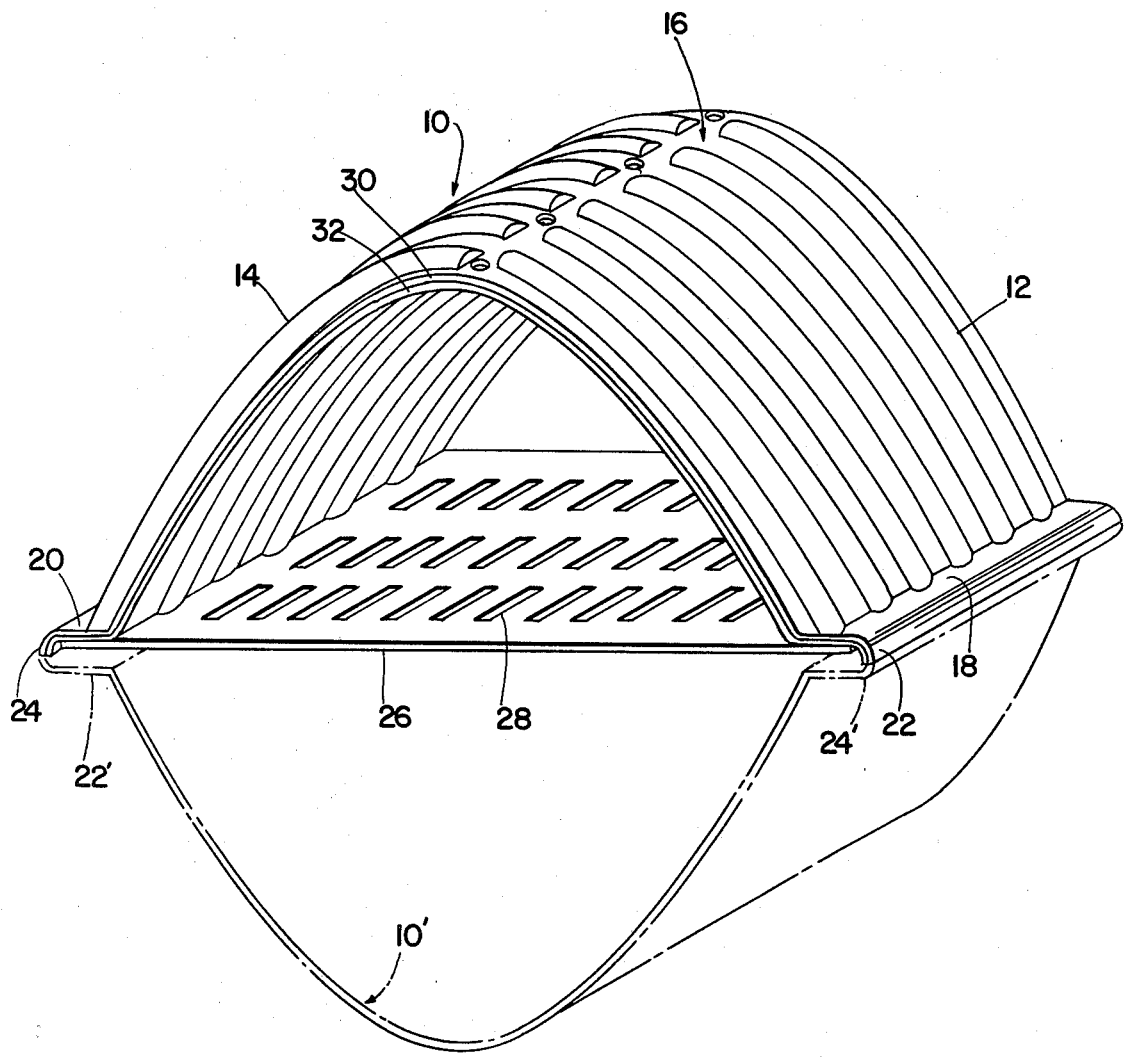
FIG. 1 is a perspective view of a corrugated plastic tubing or conduit construction which is manufacturable with the present apparatus and method.

With reference to FIG. 1, an exemplary tubing structure manufacturable with the present method and apparatus is illustrated to facilitate understanding of the present invention. The exemplary tubing structure including a top wall 10 made up of a pair of corrugated side walls 12 and 14 which are longitudinally connected at an apex area by a hinge means 16. Opposite the apex area at base ends, the side walls have a pair of outwardly extending flanges 18 and 20. Each of the flanges has a downward extending claw portion 22 and 24 for gripping a soil bed for inhibiting inward and outward movement of the base ends of the side walls. Connected between the side wall base ends is a flexible base 26 having a plurality of apertures 28 therein. The top wall has a layered configuration including an outer layer 30 and an inner layer 32. Optionally, additional layers may also be provided. In the preferred embodiment, the outer layer is a relatively thin layer of white polyethylene i.e. polyethylene with a titanium dioxide filler, and the inner layer is a black polyethylene, i.e. polyethylene with a carbon black filler. Other layered materials are contemplated by the present invention including materials which are not rheologically compatible.

Figure 2:
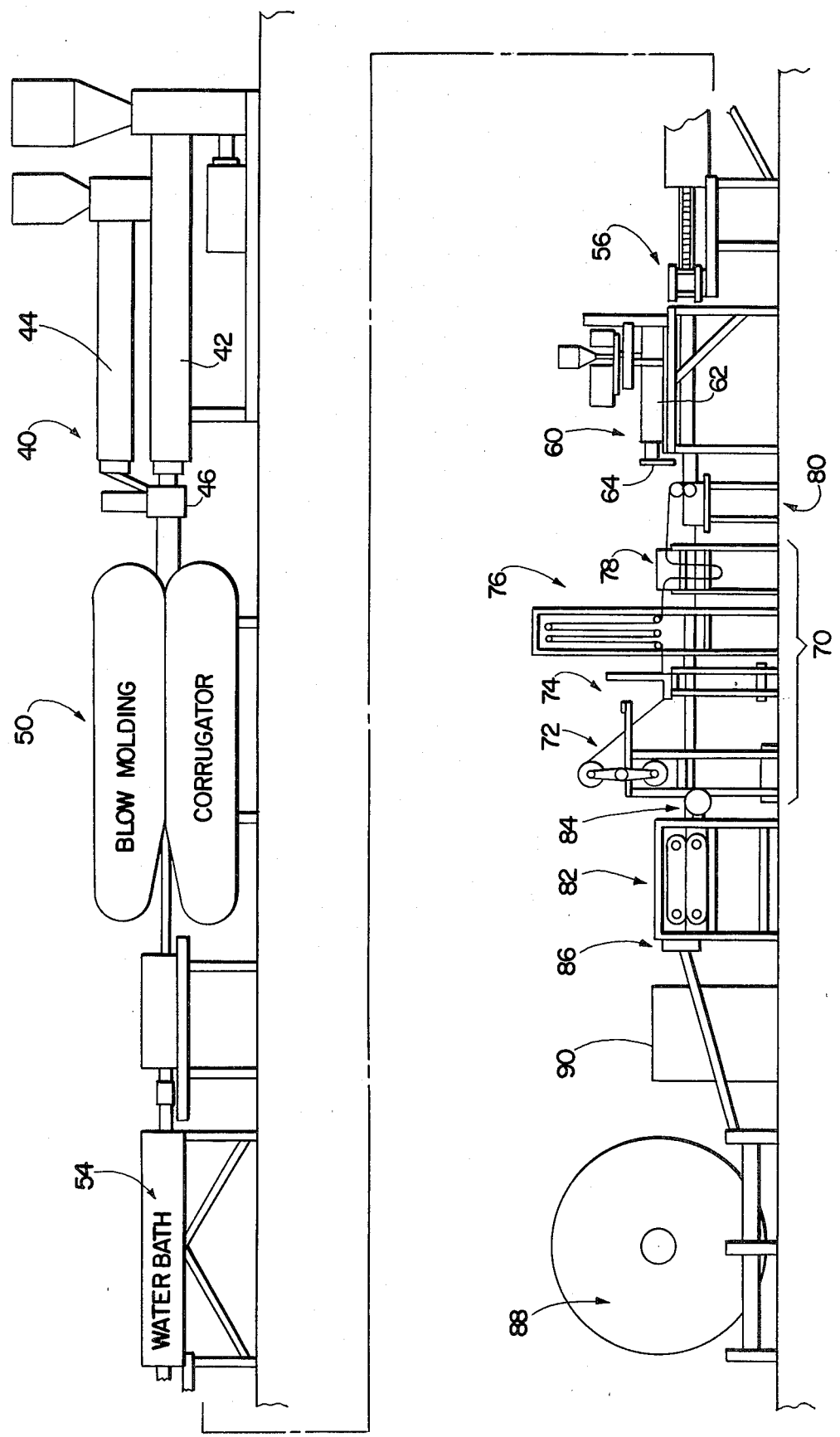
FIG. 2 is a diagram of a corrugated plastic tubing assembly line with a coextrusion die assembly in accordance with the present invention.

With particular reference to FIG. 2, the apparatus and method for manufacturing the conduit product includes an extrusion means 40. The extrusion means includes a first extruder 42 for plasticizing the inner layer plastic material and a second extruder 44 for plasticizing the outer layer of plastic material. An extrusion die 46 receives flows of the plasticized inner and outer plastic materials and forms them into a generally circular, concentrically layered sleeve or tube. The layered sleeve is received by a blow molding corrugator means 50. The blow molding corrugator exerts a pneumatic pressure on the interior of the extruded plastic sleeve forcing it into conformity with a plurality of mold blocks. The mold blocks are connected in runs which move at substantially the same speed as a plastic sleeve is extruded such that the sleeve and the mold blocks move together. The mold blocks engage the sleeve for a sufficient distance that the plastic sleeve cools and becomes able to hold its molded form. The blow molding corrugator molds a corrugated tubular product which includes a first and a second top wall. With reference again to FIG. 1, the parts of the second top wall are shown in phantom and labeled with the same reference numeral as corresponding parts in the first top wall but followed by a prime ('). The claw portions 22 and 24 of the first top wall 10 are integrally connected with the claw portions 22' and 24' of the second top wall 10'. The corrugated tubular product from the blow molding corrugator 50 is cooled in a water bath 54 to bring it to a more rigid configuration. A slitting means 56 cuts the claw portions 22 and 24' and the claw portion 24 and 22' apart creating two top walls. The two top walls are rotated such that their base ends are facing upward and their apex areas downward in a front to back, parallel relationship.

A bead applying means 60 including an extruder 62 and a plurality of applicator heads 64 applies a bead of hot, softened plastic material along the four base ends of the two top walls. A flexible base material strip feeding means 70 feeds substantially continuous lengths of the flexible base material for attachment to the front and rear top walls. The flexible base feeding means includes a take off stand 72 for holding operating rolls of the flexible base material and the back up rolls of the flexible base material. A splicing means 74 splices the trailing end of each operating roll with the leading end of the back up roll to connect the flexible material from the two rolls into continuous lengths. After a splice, the back up roll is rotated into the position of the operating roll and a new back up roll supplied. To allow the flexible base material feeding means to continue feeding the base material during a splice, an accumulator means 76 is provided. The accumulator means accumulates a reservoir of the flexible material between splices and plays it out during a splice. If the flexible base is to be slit or perforating and is not already perforated, a slitting means 78 is provided for cutting the slits 28 into the base material. The front and rear flexible base material strips are fed to a pressing means 80 which presses the front and rear flexible strips onto the hot beads along each of the top wall base edges. Various other attaching means such as sewing, stapling, sonic-welding, or the like may also be utilized for attaching the flexible base material with the top walls. A pulling means 82 pulls the conduit product including the top walls and flexible bases through the water bath 54, the slitting means 56, the attaching means 60 and 80, and the flexible material feeding means 70. In the preferred embodiment, each conduit product is folded as it leaves the attaching means 80 about its hinge means 16 with its base ends adjacent and the flexible base between the side walls. The two folded conduit products are pressed into their folded configuration by the pulling means as it grips them to pull them along. Front and rear conduit counting wheels 84 are provided for counting or measuring the length of conduit material passing thereby. A cutoff means 86 cuts the front or rear length of conduit after a predetermined length of conduit has been counted by the counting wheel 84. The folded conduit is wound onto take-up reels 88. Various lengths of conduit may be wound on each reel such as one mile length of folded conduit. Optionally, splicing means 90 may be provided for splicing lengths of the conduit together to form a continuous conduit length. For example, if defective conduit is manufactured, the cutoff means 86 severs the conduit and the defective portion is discarded. When the assembly line again starts producing acceptable conduit, the trailing end of the already produced acceptable conduit and the leading end of the newly produced acceptable conduit are spliced together and the winding operation onto reel 88 is continued with a substantially continuous length of conduit.

Figure 3:
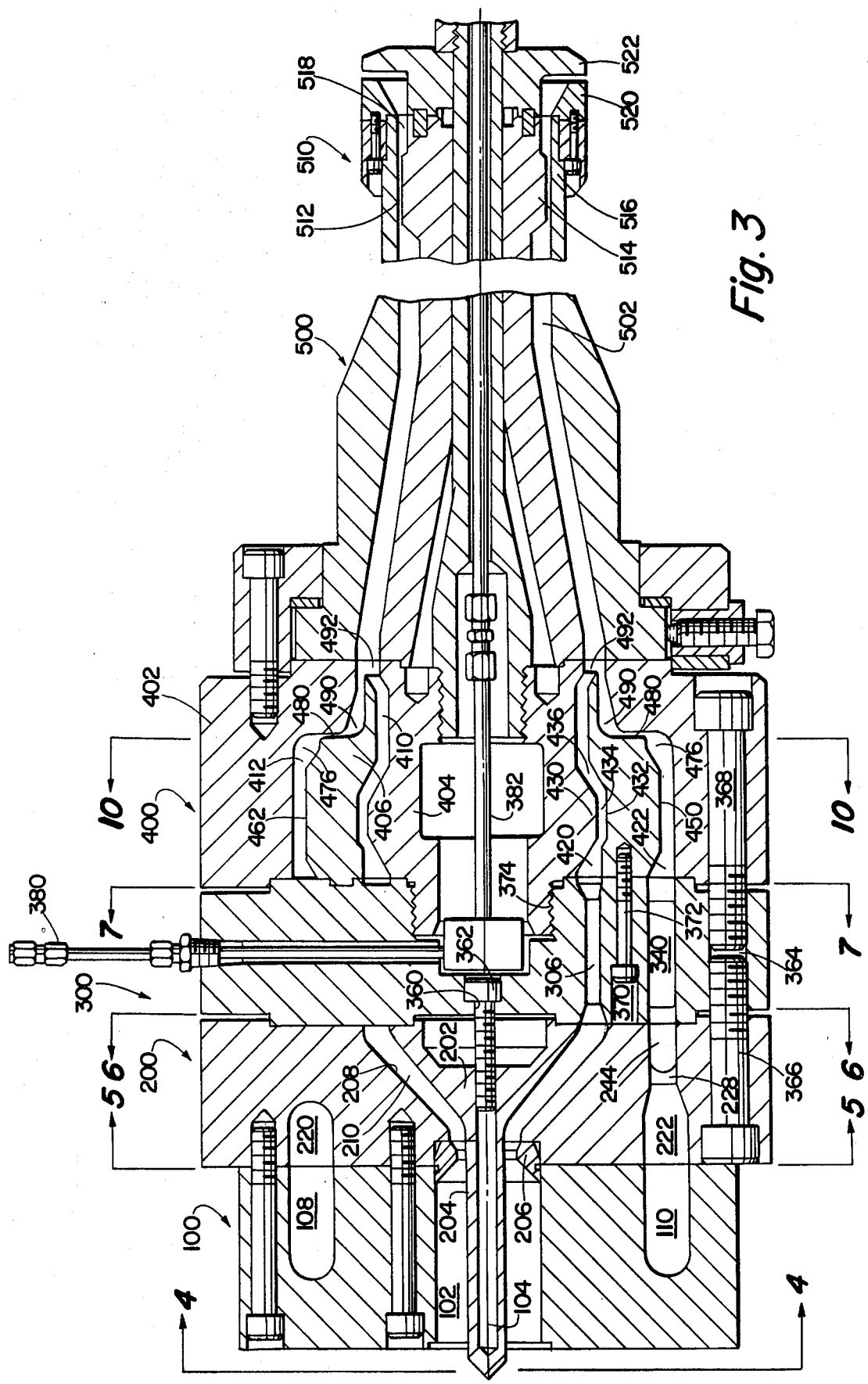
FIG. 3 is a cross sectional view of a coextrusion die assembly in accordance with the present invention.
Figure 4:
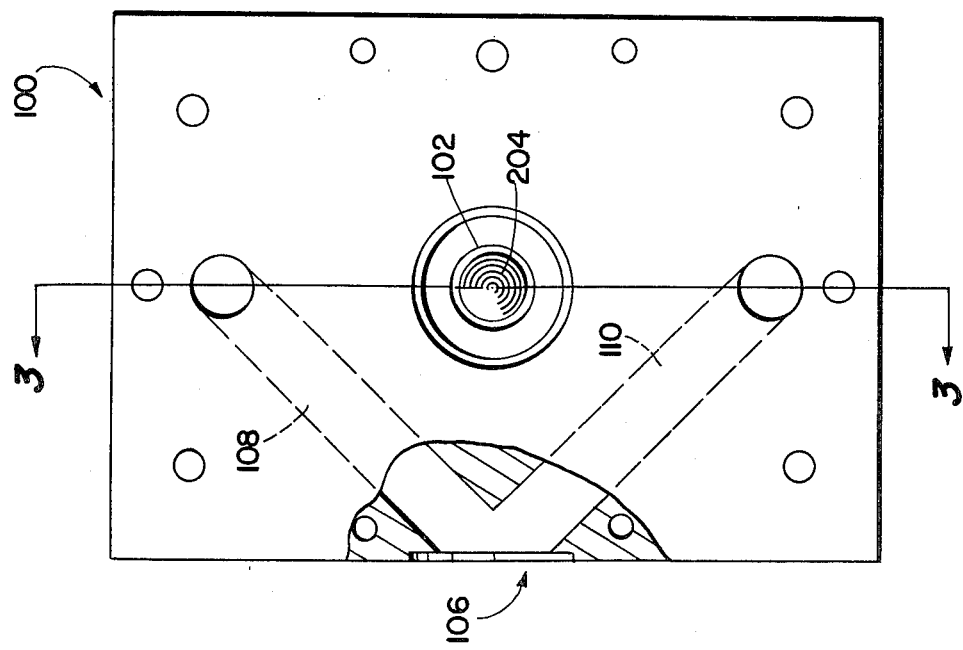
FIG. 4 is an end view of the coextrusion die assembly of FIG. 3.

With particular reference to FIGS. 3 and 4, the extrusion die assembly 46 includes an inlet block or means 100. A portion of the inlet block is a first inlet means for defining a first or inner inlet 102 in axial alignment with a central longitudinal axis 104. Another portion of the inlet block is a second inlet means for defining a second or outer inlet 106. The inner inlet 102 is connected with the first extruder 42 from which it receives a flow of a first plasticized material, e.g., plasticized black polyethylene, which is to form the inner layer of the layered tubular structure. The outer inlet 106 is connected with the second extruder 44 from which it receives a flow of a second plasticized material, e.g., plasticized white polyethylene, which is to form the outer layer of the layered tubular structure. The outer inlet 106 includes a first inlet passage 108 and a second inlet passage 110, each of which receives half of the flow from the second extruder. By positioning the first and second inlet passages 108 and 110 symmetrically with respect to the inlet 106, giving each the same cross section and giving each the same surface treatment, the flow of the plasticized material received at the outer inlet 106 is divided evenly between them and has the same flow rate and flow velocity in each.

Figure 5:
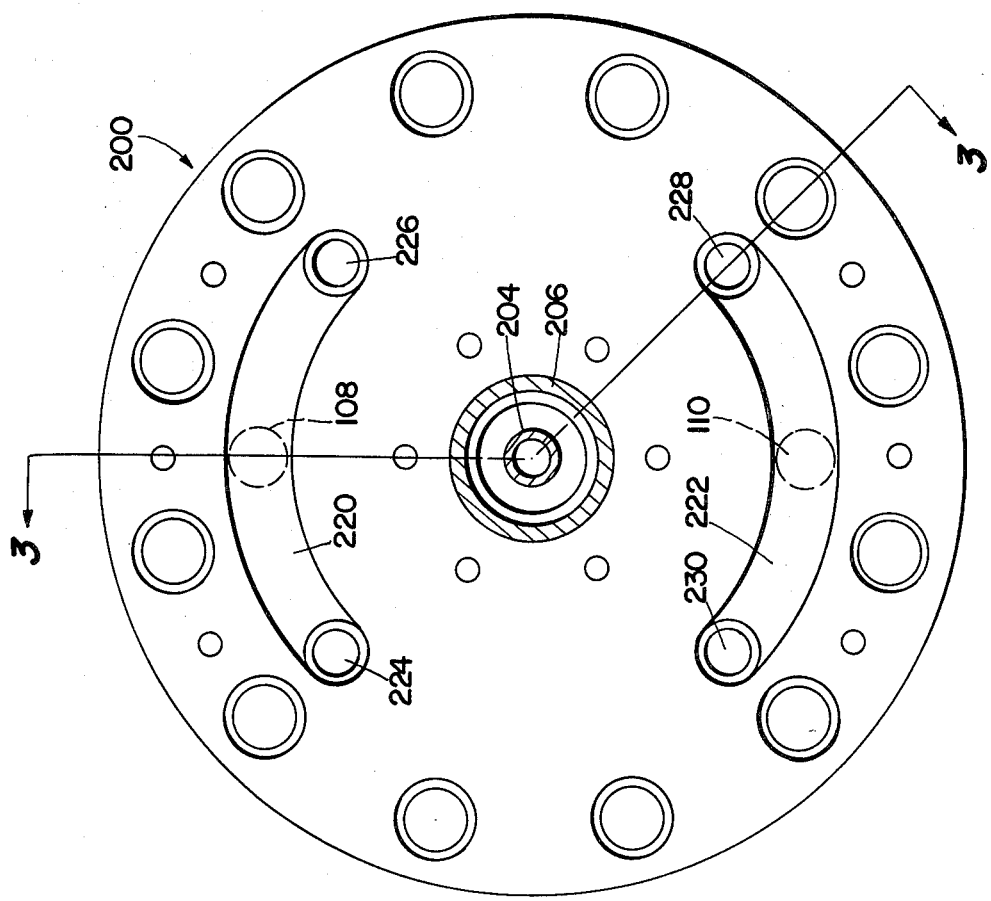
FIG. 5 is a transverse sectional view through section 5—5 of the coextrusion die assembly of FIG. 2.

With particular reference to FIGS. 3 and 5, a manifold means or block 200 is provided adjacent the inlet block 100. The manifold means divides the inner material flow from the outer inlet 106 into a plurality of equal flows. The manifold means further shapes the inner material flow into a conical, tubular flow. The manifold means 200 includes a conical divider 202 arranged symmetrically about the longitudinal axis 104. An elongated divider projection 204 is arranged along the longitudinal axis to start shaping the first material flow into a tubular flow. A flow shaping insert or collar 206 and the divider projection 204 define a precisely uniform annular gap therebetween. The symmetry and the uniformity of the annular gap cause the inner plastic material to flow at substantially the same rate and velocity at all points around its periphery. Opposite the conical divider 202, the manifold means 200 includes a divergent, generally conical surface 208. The conical divider 202 and conical surface 208 define a diverging circularly tubular passage 210 therebetween. The conical divider 202 and the conical surface 208 are disposed concentric such that the cross section of the diverging tubular passage 210 around its periphery is substantially the same. This causes the velocity and flow rate of the inner material flow to remain substantially the same at any point around a common transverse periphery of the diverging tubular passage 210.

The outer plastic material flow is received from the first and second inlet passages 108 and 110, which are superimposed in phantom in FIG. 5 for simplicity of illustration. The outer flow from inlet passage 108 is received in a first upstream arcuate recess 220 and the outer flow from inlet passage 110 is receive in a second upstream arcuate recess 222. The first upstream arcuate recess 220 is disposed symmetrically about the first inlet passage 108 such that the received flow of the outer plastic material is again divided evenly in half. The first upstream arcuate recess 220 is connected at one end with a first longitudinal manifold bore 224 and at its other end with a second longitudinal bore 226. The first and second longitudinal manifold bores 224 and 226 are arranged symmetrically with respect to the first inlet passage 108 such that each receives a quarter of the outer material flow at the same velocity and flow rate. Similarly, the second upstream arcuate recess 222 is connected at one end with a third longitudinal manifold bore 228 and at its other end with a fourth longitudinal manifold bore 230. In this manner, the second inlet passage half of the outer material flow is divided in half such that the third and fourth longitudinal manifold bores each receive a quarter of the outer material flow at the same velocity and flow rate. The first and second upstream arcuate recesses are each about 90° in circumference such that the first, second, third, and fourth longitudinal manifold bores are disposed symmetrically at 90° intervals about the longitudinal axis.

With particular reference to FIGS. 3 and 6, the first, second, third, and fourth longitudinal manifold bores connect, respectively with first, second, third, and fourth downstream arcuate recesses 240, 242, 244, and 246. The first downstream arcuate recess 240 is connected centrally with the first longitudinal manifold bore 224 and extends symmetrically over a circularly arcuate span of just over 45°. Similarly, the second downstream arcuate recess 242 is connected centrally with the second longitudinal manifold bore 226 and spans an arc of just over 45°. The third downstream arcuate recess 244 is connected centrally with the third longitudinal manifold bore 228 and extends over a circular arc segment of just over 45°. The fourth arcuate recess 246 is connected centrally with the fourth longitudinal manifold bore 230 and extends symmetrically over a circular arc segment of just over 45°. In this manner, the manifold means divides the second material flow into eight equal flows which are disposed at 45° intervals in a circular path concentric with the longitudinal axis.

With particular reference to FIGS. 3 and 7, a spider structure 300 provides structural support for various die parts and subassemblies, particularly those disposed inside the tubular plastic flows. To provide this structural support to internal parts, the first and second material flows must be divided sufficiently that rigid structures can be connected through the flows to the internal parts. The spider structure 300 has a first plurality of apertures 302, 304, 306 and 308 extending longitudinally therethrough from an upstream side to a downstream side. The first plurality of apertures are arcuate and disposed intermittently along a circular periphery to alignment with the diverging tubular passage 210. The inner material flow is divided evenly among the inner plurality of spider apertures into a plurality of equal flows with the same velocity and flow rate.

Figure 8:
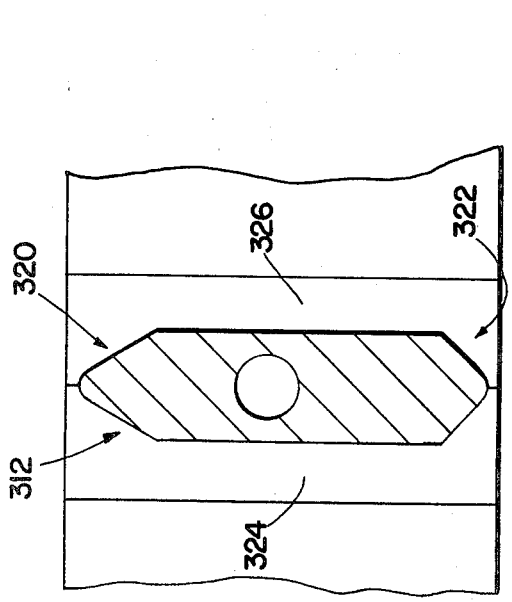
FIG. 8 is a sectional view through section 8—8 of FIG. 7.

With particular references to FIG. 8, the spider has a first plurality of bridge portions 310, 312, 314 and 316 disposed between the first spider apertures. Each of the first bridges has a relatively sharp upstream face 320 and a relatively blunt downstream face 322. The upstream face 320 divides the uniform tubular flow in the diverging passage 210 between the two apertures which it separates. The adjoining apertures have enlarged portions 324 and 326 adjacent the bridge to accommodate the flow that is displaced by the bridge. The convergence of the downstream face 322 effectively increases the cross section of the adjoining apertures, particularly of the enlarged portions. This increase in cross section encourages transverse flow components such that the flow portions merge around the downstream face back into a tubular flow.

Referring again to FIGS. 2 and 6, the spider structure 300 further has a second or outer plurality of apertures disposed in a circular path concentric with the longitudinal axis 104 and the inner plurality of apertures. The outer spider apertures, in the preferred embodiment, includes eight apertures 330, 332, 334, 336, 338, 340, 342, and 344 extending from the upstream side to the downstream side of the spider structure.

Figure 9:
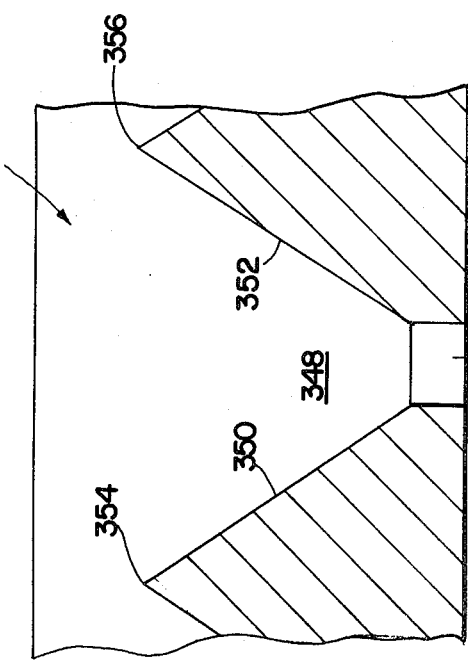
FIG. 9 is a sectional view through section 9—9 of FIG. 7.

With particular reference to FIG. 9 which typifies all of the outer spider apertures, each of the outer spider apertures includes a relatively small diameter opening 346 on an upstream side and a fan portion 348 on the downstream side. The downstream fan portion 348 has diverging peripheral walls 350 and 352 which fan or diverge peripherally outward from the upstream opening 346 and terminate adjacent the downstream side at knife edge portions 354 and 356. At the knife edge portions, the fan portion meets two adjoining fan portions in a peripheral region. The upstream opening 346 is aligned with an end of downstream arcuate recess 246 to receive one of the eight equal flows therefrom. Similarly each of the outer spider aperture upstream openings aligns with an end of one of the downstream arcuate recesses of the manifold means 200. As the outer material flow exits the upstream opening 346 and enters the fan portion 348, the flow rate slows. However, the flow rate tends to slow non-uniformly peripheraly along the fan portion 348. The flow rate in longitudinal alignment with the upstream opening 346 is higher than the flow rate adjacent the knife edges 354 and 356. Similarly, the flow rate of the outer material flow is greater in longitudinal alignment with each of the eight upstream openings and slower in longitudinal alignment with each of the eight knife edge portions. Dividing the outer material into eight equal flows through the spider has been found to be convenient for extruding sleeves about six inches in diameter. Obviously, the outer material flow may be divided into a greater or lesser number of flows, particularly when larger or smaller diameter sleeves are to be extruded.

Referring again to FIGS. 3 and 7, the spider structure has a central bore 360 concentric with longitudinal axis 104 for receiving a machine screw 362 for connecting the conical divider 202. A plurality of threaded bores, including bore 364 which receives machine screws 366 and 368, are provided for connecting various parts with the spider. Another plurality of bores, including bore 370 which receives machine screw 372, are provided for supporting various downstream parts to be explained in detail below. The spider further has large threaded bore 374 for receiving a threaded portion of yet another downstream part. Analogously, the spider may have various other connecting means for connecting and supporting associated die parts. In the preferred embodiment, the spider structure also supports a pneumatic inlet line 380 and a pneumatic line 382 which extends concentrically along the longitudinal axis 104. The pneumatic lines 380 and 382 provides pneumatic pressure to the molding means located downstream from the extruder die for creating the appropriate pressure differential between the inside and outside for the extruded sleeve during the molding operation. In the preferred embodiment, the pneumatic lines carry a positive pressure for urging the extruded sleeve outward against the blow mold corrugator mold blocks.

Referring to FIG. 3, disposed downstream from the spider structure are means 400 for defining inner and outer tubular passages for defining and carrying concentric tubular flows of the inner and outer materials. The tubular passage forming means 402 includes an outer compression ring 400 disposed concentrically around the longitudinal axis, an inner compression ring 404 disposed concentrically around the longitudinal axis, and a regulator ring 406 disposed concentrically about the longitudinal axis between the inner and outer compression rings. A first or inner tubular passage 410 is defined between the inner surface of the regulating ring 406 and the outer surface of the inner compression ring 404. A second or outer tubular passage 412 is defined between the inner surface of the outer compression ring 402 and the outer surface of the regulating ring 406. The outer compression ring 402 is securely bolted to the spider structure with a plurality of machine screws including screw 368. The inner compression ring 404 is threadingly received in threaded bore 374 of spider structure. The regulating ring 406 is bolted with the spider structure with a plurality of machine screws, including screw 372. In this manner, the spider structure 300 provides support for various parts and subassemblies of the extruder die, particularly those disposed within the interior of all or part of the tubular plastic flows.

The inner compression ring 404 and the regulating ring 406 define a first enlarged peripheral region or first plenum 420 around an upstream end of the inner tubular passage adjacent the downstream end of the first of spider structure apertures 302–308. Optionally, the portions of the spider structure may form the first plenum. The first plenum has a radial, cross sectional area which is larger than the total cross sectional area of all the first or inner spider apertures. This increase in cross sectional area slows the inner material flow and introduces radial and peripheral velocity components from faster moving portions of the flow to slower moving portions. This averages the longitudinal flow rate around the periphery of the plenum making the flow more peripherally uniform.

Adjacent the outer spider apertures 330–344, the outer compression ring 402 and the regulating ring 406 define a second enlarged peripheral region or second plenum 422. The second plenum is defined by a portion of the inner surface of the outer compression ring, a portion of the outer surface of the regulating ring and a portion of the downstream side of the spider. The second plenum has a greater transverse cross section than the combined cross section of the outer spider apertures such that the outer material flow slows as it enters the second plenum. The second plenum averages and tends to equalize the second material flow velocity around the periphery of the outer tubular passage 412.

A first uniform restriction means is disposed in the first tubular passage 410 to shear the first material flow and increase its velocity uniformly. The first uniform restriction means includes a uniform peripheral projection 430 on the inner compression ring 404 and a shallow peripheral recess 432 on the regulator ring 406. The peripheral projection and recess decrease the width of the inner tubular passage 410 along a first uniformly restricted region 434. This decrease in the width of the first tubular passage 410 accelerates the velocity of the inner material flow. The restricted region 434 introduces a shear which lowers the viscosity of the inner material flow. The acceleration of the lowered viscosity material flow tends to reduce any gradients in the flow velocity around periphery of the tubular passage and to press together and merge the plurality of flows from the spider apertures into a single flow. Optionally, the peripheral projection 430 may project from regulator ring 406, be a separate element, or the like.

Downstream from the first uniform restriction means the adjacent surfaces of the inner compression ring 402 and the regulator ring 406 diverge to define a third peripherally enlarged region or third plenum 436. The third plenum again slows the velocity of the inner material flow continuing the averaging of any velocity gradients around the periphery of the first inner tubular passage.

Figure 10:
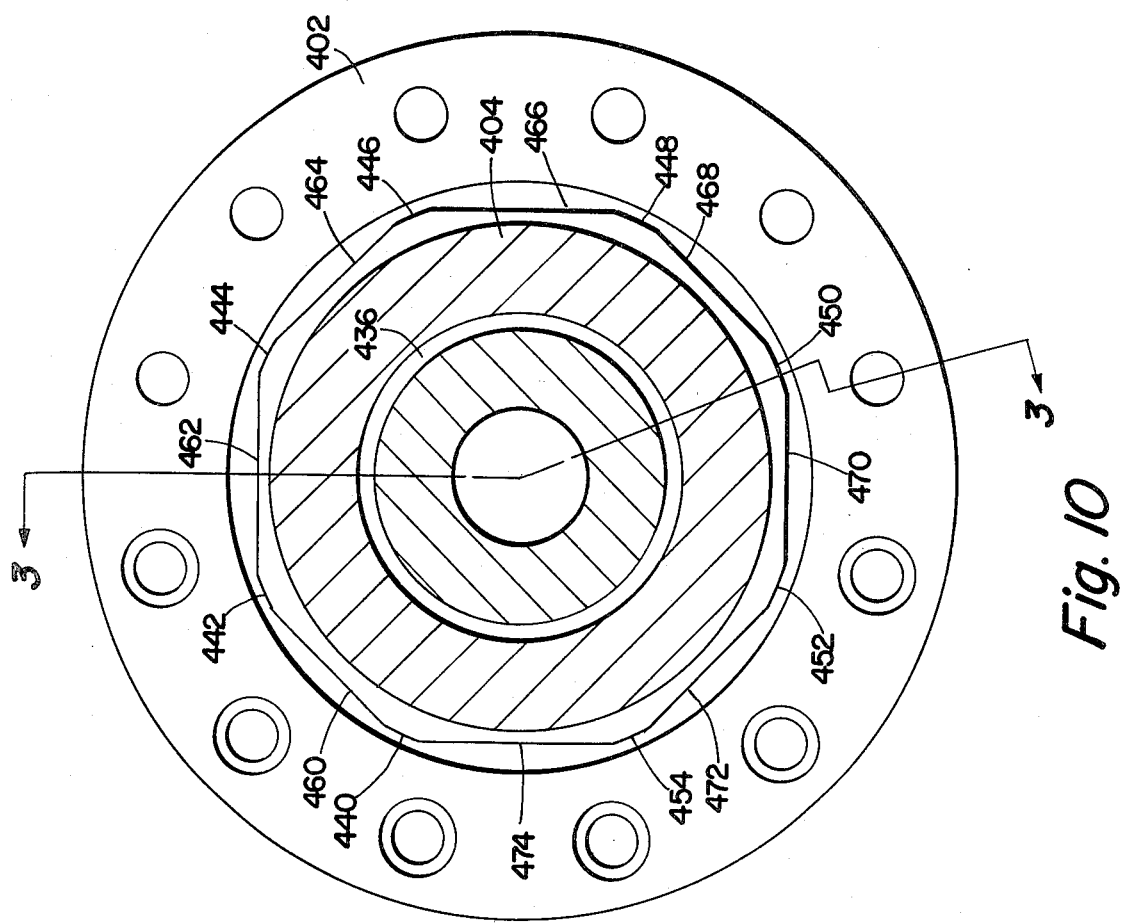
FIG. 10 is a transverse sectional view through section 10—10 of the coextrusion die assembly of FIG. 3.

A nonlinear restriction means is disposed in the outer tubular passage 410 for restricting the width of the passage non-uniformly around its periphery. The nonlinear restriction means, unlike the linear restriction means, introduces gradients into the second outer material flow. The nonlinear restriction means is selected to introduce gradients which are the inverse of the gradients in the flow as it emerges from the downstream side of the spider 300. With particular reference to FIG. 10 and continuing reference to FIG. 3, the nonlinear restriction means includes a plurality of larger projections 440, 442, 444, 446, 448, 450, 452 and 454 which are disposed in longitudinal alignment with the upstream openings of the outer spider apertures 330, 332, 334, 336, 338, 340, 342, and 344, respectively. Between the larger projections, the nonlinear restriction means includes a plurality of lesser projections 460, 462, 464, 466, 468, 470, 472, and 474 which are disposed in longitudinal alignment with respective spider knife edge portions. In this manner, the nonlinear restriction means defines more restrictive regions in longitudinal alignment with each other spider aperture opening and less restrictions regions in alignment with each spider knife edge portion. This slows the higher velocity outer material flow components along the axis of the outer spider aperture openings relative to the lower velocity components in line with the spider knife edge portions. More specifically, the nonlinear restriction means accelerates all portions of the outer material flow but accelerates the slower components more than the faster components. Between the more and less restrictive regions are regions of intermediate restriction. In the preferred embodiment, there is a linear transformation between the more or less restrictive regions. Optionally, other transformations such as exponentially decreasing, arcuate, and the like may be utilized.

Adjacent the downstream end of the nonlinear restriction means, the adjoining surfaces of the outer compression ring 402 and the regulation ring 406 diverge to define a fourth enlarged peripheral region or fourth plenum 476 in which the outer plastic material flow is slowed.

Adjacent the fourth plenum 476, the adjoining surfaces of the outer compression ring 402 and the regulating ring 406 define a second uniform restriction means. In the preferred embodiment, the second uniform restriction means defines a restricted area 480 which is much narrower and more restrictive than the restrictive regions of the first uniform restriction means or the nonlinear restriction means. This high degree of restrictiveness causes a relatively high shear in the plastic. The second uniform restriction means is disposed at an angle to the longitudinal axis such that a radial component in the flow of the outer plastic material is induced. The radial component moves any velocity gradient outward which tends to smooth and average any velocity gradients. In the preferred embodiment, the second uniform restriction is disposed at a 90° angle to the longitudinal axis, although other less sever angles are contemplated.

Disposed adjacent and downstream from the second uniform restriction means, the outer compression ring and the regulating ring adjoining surfaces define a fifth peripherally enlarged region or fifth plenum 490. In the fifth plenum, the velocity of the outer plastic material slows again averaging and smoothing any velocity gradients which may be present.

Adjacent and downstream from the third and fifth plenums, the first and second tubular passages are concentric and merge into an outlet passage 492. This merges the first and second fluid flows into a single layered flow. It is to be appreciated that the layered flow was made without regard to any rheological similarity or difference in the inner and outer plastic materials. Thus, the invention enables a precise, layered flow to be extruded as a layered sleeve or tube. The layers have precise uniformity whether the flows are of rheologically compatible or incompatible materials.

With continued reference to FIG. 3, downstream from the tubular passage forming means 400 is an elongated barrel or extension means 500. The elongated barrel 500 extends the outlet passage 429 with an extended outlet passage 502. Near the downstream end of the outlet passage 502 is a shaping means 510 which shapes the layered outlet flow from a circular flow to an elliptical flow, in the preferred embodiment. The shaping means 510 includes an elliptical restricted region 512 which is defined by an elliptical peripheral projection 514 and an elliptical sleeve portion 516. The elliptical restrictive region is relatively narrow to create a high shear to increase the fluidity of the plastic materials. Downstream from the elliptical restriction region 512 is a circular plenum 518. In this manner, an elliptical sleeve is discharged which is thinner adjacent the major axis portions and thicker adjacent the minor axis. This provides extra plastic for forming the flange portions 18 and 20. When the invention is used to manufacture circular or other shape tubings, the shaping means 510 includes a circular or other corresponding restricted region.

Downstream from the shaping means 510 is an outside flair 520 and an inside flair 522. A radially discharge outlet is defined between the inside and outside flairs. The radial discharge impells the layered flow against the mold blocks of the blow molding corrugator 50. The elongated barrel, elliptical shaping means, and the shape of the flairs adapt the invention for the manufacture of the conduit product illustrated in FIG. 1.

The invention has been described with reference to the preferred embodiment. Obviously, modifications and alterations will occur to others upon reading and understanding the preceding detailed description of the preferred embodiments. It is intended that all such alterations and modifications be included within the scope of the invention insofar as they come within the scope of the appended claims or the equivalents thereof.

Having thus described a preferred embodiment of the invention, the invention is now claimed to be:

1. An extrusion die assembly for extruding multi-layered tubular products, the die assembly comprising:
 a spider structure having an upstream side, a downstream side, a first plurality of apertures extending between the upstream and downstream side generally surrounding a longitudinal axis and a second plurality of apertures extending between the upstream and downstream sides generally surrounding the longitudinal axis, each aperture of the second spider structure apertures being defined by a discrete opening adjacent the ustream side and fanning toward a substantially continuous annulus generally adjacent the downstream side;

a first inlet means for defining a first inlet;

a second inlet means for defining a second inlet;

a manifold means for connecting the first inlet means with the upstream side of the first spider structure apertures and for connecting the second inlet means with the upstream side of the second spider structure apertures;

a first tubular passage means for defining a first tubular passage, the first tubular passage means being operatively connected with the downstream side of the first spider structure apertures;

a second tubular passage means for defining a second tubular passage, the second tubular passage means being operatively connected at downstream side of the second spider structure apertures; and, a tubular outlet passage operatively connected with downstream ends of the first and second tubular passage means, the first and second tubular passage means downstream ends being concentrically disposed.

2. The die assembly as set forth in claim 1, further including nonlinear restriction means disposed in the second tubular passage for restricting the width of the passage nonuniformly, the nonlinear restriction means defining more restrictive regions substantially in longitudinal alignment with the second spider structure apertures and less restrictive regions therebetween.

3. The die assembly as set forth in claim 2 further including a first plenum means for defining a first plenum adjacent the spider downstream side of the first spider structure apertures, the first plenum having a greater transverse cross section than the combined transverse cross section of the first spider structure apertures.

4. The die assembly as set forth in claim 3 further including a second plenum means for defining a second plenum adjacent the second spider apertures downstream side, the second plenum having a greater transverse cross section than the combined transverse cross section of the first spider structure apertures.

5. The die assembly as set forth in claim 3 further including a first uniform restriction means disposed in the first tubular passage for restricting the width of the first passage substantially uniformly.

6. The die assembly as set forth in claim 5 further including a third plenum means for defining a third plenum, the third plenum being disposed in the first tubular passage downstream from the first uniform restriction means.

7. The die assembly as set forth in claim 6 further including a fourth plenum means for defining a fourth plenum, the fourth plenum being disposed in the second tubular passage downstream from the nonlinear restriction means.

8. The die assembly as set forth in claim 7 further including a second uniform restriction means for defining a uniform restriction in the width of the second tubular passage downstream from the fourth plenum means.

9. The die assembly as set forth in claim 8 further including a fifth plenum means for defining a fifth plenum, the fifth plenum means being disposed downstream from the second uniform restriction means.

10. The die assembly as set forth in claim 9 wherein adjacent the second uniform restriction means the second tubular passage is disposed at an angle to the longitudinal axis, such that radial flow components are induced.

11. An extrusion die assembly for extruding multi-layered generally cylindrical tubular products, the die assembly comprising:

a first inlet means for defining a first inlet substantially in alignment with a longitudinal axis for receiving a flow of a first plastic material;

a second inlet means for defining a second inlet for receiving a flow of a second plastic material;

a manifold means operatively connected with the second inlet for dividing the second material flow into a plurality of generally equal flow portions;

a spider structure having a first plurality of spider apertures extending therethrough disposed generally in a circle concentric with the longitudinal axis, the first spider apertures being operatively connected with the first inlet means such that the first material flow is divided among and flows through the first spider apertures, the spider structure further having a second plurality of apertures extending therethrough disposed generally in a circle concentric with the longitudinal axis, each of the second spider apertures being operatively connected with the manifold means for receiving a portion of the second material flow therefrom;

a first tubular passage means for defining a first generally circular, tubular passage concentric with the longitudinal axis, the first tubular passage means being operatively connected with the first spider apertures such that the first tubular passage receives the first material flow therefrom;

a second tubular passage means for defining a second generally circular, tubular passage concentric with the longitudinal axis, the second tubular passage means being operatively connected with the second spider apertures to receive the second material flow therefrom;

a nonlinear restriction means disposed in the second tubular passage for restricting flow therethrough nonlinearly around the periphery of the second tubular passage, the nonlinear restricting means defining more restrictive regions substantially in longitudinal alignment with each of the spider second apertures and relatively less restrictive regions peripherally therebetween, such that the velocity of the second material flow which tends to be higher in longitudinal alignment with each of the second plurality of apertures and slower therebetween tends to be equalized; and, the first and second generally tubular passages each having a downstream end at which the first and second tubular passages merge into a outlet passage, the outlet passage carrying a layered flow of plastic material.

12. The die assembly as set forth in claim 11 further including a first plenum means for defining a first plenum downstream from the first plurality of spider apertures such that as the first material flow emerges from the first spider apertures its velocity slows and a peripheral component of velocity tends to be introduced merging the plurality of flow portions emerging from the first spider apertures into a single, tubular flow.

13. The die assembly as set forth in claim 12 further including a first uniform restriction means for defining a first peripherally uniform restriction in the first tubular passage downstream from the first plenum means such that the first material flow through the first tubular passage is accelerated.

14. The die assembly as set forth in claim 13 further including another plenum means for defining a plenum downstream from the first uniform restriction in the first tubular passage such that the velocity of the first material flow slows and any gradients in the velocity around the periphery of the flow tends to be equalized.

15. The die assembly as set forth in claim 11 further including a second plenum means disposed adjacent the second spider apertures such that the velocity of the second material flow slows which tends to introduce peripheral velocity components that tend to merge the flow portions from each of the second spider apertures together into a single tubular flow.

16. The die assembly as set forth in claim 15 wherein each of the second spider apertures fans divergently outward toward the second plenum such that the slowing of the velocity of the second fluid flow begins within the second spider apertures.

17. The die assembly as set forth in claim 15 further including another plenum downstream from the nonlinear restriction means such that the velocity of the second plastic flow is slowed and any peripheral gradients in its velocity tend to be averaged and equalized.

18. The die assembly as set forth in claim 17 further including a second uniform restriction means disposed in the second tubular passage such that the velocity of the second material flow is increased uniformly around the periphery of the second tubular passage.

19. The die assembly as set forth in claim 18 wherein the second tubular passage has an angular portion disposed adjacent the second uniform restriction means such that a radial component in the second material flow is created.

20. The die assembly as set forth in claim 19 further including a fifth plenum means for defining a fifth plenum downstream in the second tubular passage from the second uniform restriction means such that the velocity of the second material flow is reduced averaging and equalizing any gradients in the velocity of the second material flow.

21. An apparatus for manufacturing plastic conduit comprising:
   a first extrusion means for producing a first plasticized material flow;
   a second extrusion means for producing a second plasticized material flow;
   an extrusion die assembly for forming the first and second material flows into a tubular layered flow having one layer of the first material and another layer of the second material, the extrusion die assembly being operatively connected with the first and second extrusion means, the extrusion die assembly including:
      a first inlet means for defining a first inlet for receiving the first plastic flow;
      a second inlet means for defining a second inlet for receiving the second material flow;
      a manifold means operatively connected with the second inlet for dividing the second material flow into a plurality of generally equal flow portions;
      a spider structure having a first plurality of spider apertures therethrough which are operatively connected with a first inlet and a second plurality of apertures extending therethrough which are operatively connected with the manifold means to receive the plurality of second material flow portions therefrom;
      a first tubular passage means for defining a first tubular passage, the first tubular passage means being operatively connected with the first spider apertures to receive the first material flow therefrom;
      a second tubular passage means for defining a second tubular passage generally concentric with the first tubular passage, the second tubular passage being operatively connected with the second spider apertures to receive the second material flow therefrom, the second material flow having higher velocity components in longitudinal alignment with each second spider aperture and lower velocity components therebetween;
      a nonlinear restriction means disposed in second tubular passage for introducing gradients into the second material flow which gradients are inversely proportional to differences between the higher and lower velocity components, such that the higher and lower velocity components are generally velocity equalized;
      an outlet passage disposed downstream from the first and second tubular passages for receiving the first and second material flows therefrom, the outlet passage carrying a layered flow of plastic material comprising concentric flows of the first and second materials; and,
   molding means for receiving the layered sleeve from the extrusion die assembly and molding it into a generally tubular plastic product.

22. An apparatus for manufacturing plastic conduit comprising:
   a first extrusion means for producing a first plasticized material flow;
   a second extrusion means for producing a second plasticized material flow;
   an extrusion die assembly for forming the first and second material flows into a tubular layered flow having one layer of the first material and another layer of the second material, the extrusion die assembly being operatively connected with the first and second extrusion means, the extrusion die assembly including:
      a first inlet means for defining a first inlet for receiving the first plastic flow;
      a second inlet means for defining a second inlet for receiving the second material flow;
      a manifold means operatively connected with the second inlet for dividing the second material flow into a plurality of generally equal flow portions;
      a spider structure having a first plurality of spider apertures therethrough which are operatively connected with a first inlet and a second plurality of apertures extending therethrough which are operatively connected at an upstream side with the manifold means to receive the plurality of second material flow portions therefrom, each of the second spider apertures having a relatively small opening adjacent the upstream side and fanning out to a relatively large opening adjacent a downstream side, whereby the second material flow is spread as it passes through the second spider apertures;
      a first tubular passage means for defining a first tubular passage, the first tubular passage means being operatively connected with the first spider apertures to receive the first material flow therefrom;

a second tubular passage means for defining a second tubular passage generally concentric with the first tubular passage, the second tubular passage being operatively connected with the second spider apertures to receive the second material flow therefrom;

an outlet passage disposed downstream from the first and second tubular passages for receiving the first and second material flows therefrom, the outlet passage carrying a layered flow of plastic material comprising concentric flows of the first and second materials; and, molding means for receiving the layered sleeve from the extrusion die assembly and molding it into a generally tubular plastic product.

23. The apparatus as set forth in claim 22 wherein the extrusion die assembly further includes a nonlinear restriction means disposed in the second tubular passage for restricting flow therethrough nonlinearly around the periphery of the second tubular passage, the nonlinear restricting means defining more restrictive regions substantially in longitudinal alignment with each of the second spider apertures and less restrictive regions peripherally therebetween, whereby higher velocity components of the second material flow in alignment with each of the second spider apertures are reduced relative to lower velocity components therebetween.

24. The apparatus as set forth in claim 21 wherein each of the second spider apertures has a relatively small opening adjacent its upstream side and fans out to a relatively large opening adjacent its downstream side, whereby the second material flow is spread as it passes through the second spider apertures.

25. The apparatus as set forth in claim 21 further including a splitting means for splitting the molded tubing structure into at least two layered top wall portions.

26. The apparatus as set forth in claim 25 further including attaching means for attaching a flexible base across the open end of each of the top wall portions.

27. The apparatus as set forth in claim 26 further including pulling means for pulling the top wall portions.

28. The apparatus as set forth in claim 27 further including winding means for winding the top wall portions with attached flexible base materials onto reels.

29. The apparatus as set forth in claim 26 wherein the attaching means includes extruding means for extruding a bead of softened plastic material adjacent an edge of each of the top walls and means for pressing the flexible plastic strips against the beads.

30. A process of extruding multi-layered tubular products, the process comprising:
receiving a flow of a first plasticized material;
receiving a flow of a second plasticized material;
shaping the first material flow into a substantially tubular first material flow;
dividing the second material flow into a plurality of second material flow portions;
dividing the first material flow among a first plurality of apertures and causing a first material flow portion to flow through each of the apertures;
causing each of the second material flow portions to flow through a second plurality of apertures;
slowing the velocity of the first material flow downstream from the first plurality of apertures such that peripheral components are introduced into the velocity and the first material flow comes back together into a tubular first material flow;
slowing the velocity of the second material flow downstream from the second plurality of apertures such that peripheral components are introduced causing the second material flow portions to merge together into a single tubular second material flow, the second material flow having a higher velocity in peripheral regions in longitudinal alignment with each of the second plurality of apertures and a lower velocity in peripheral regions therebetween;
restricting the second material flow in regions longitudinally aligned with each of the second plurality of apertures to a greater extent then regions not longitudinally aligned with the second plurality of apertures such that the peripheral gradients in the velocity of the second material flow tend to be equalized; and,
bringing the first and second tubular flows contiguous with each other to form a layered tubular flow.

31. The process as set forth in claim 30 further including between the step of nonlinearly restricting the second material flow and the step of bringing the first and second material flows together, the step of accelerating the velocity of the second material flow by forcing it through a narrow cylindrical restrictive region and slowing the accelerated second material flow downstream from the restrictive region such that any peripheral gradients in the velocity of the second fluid flow tend to be equalized.

32. The process as set forth in claim 31 further including the steps of constricting the circumference of the tubular second material flow to create radial movement of the velocity gradients, whereby peripheral velocity gradients are averaged.

33. The process as set forth in claim 32 further including after the step of slowing the velocity of the first material flow and before the step of bringing the first and second material flows together, the step of uniformly accelerating the first material flow by forcing it through a uniform peripheral restriction region and slowing the first material flow by allowing it to flow into a widened peripheral region such that the accelerating and reducing of the velocity reduces any peripheral gradients in the first material flow.

* * * * *